Patented July 21, 1942

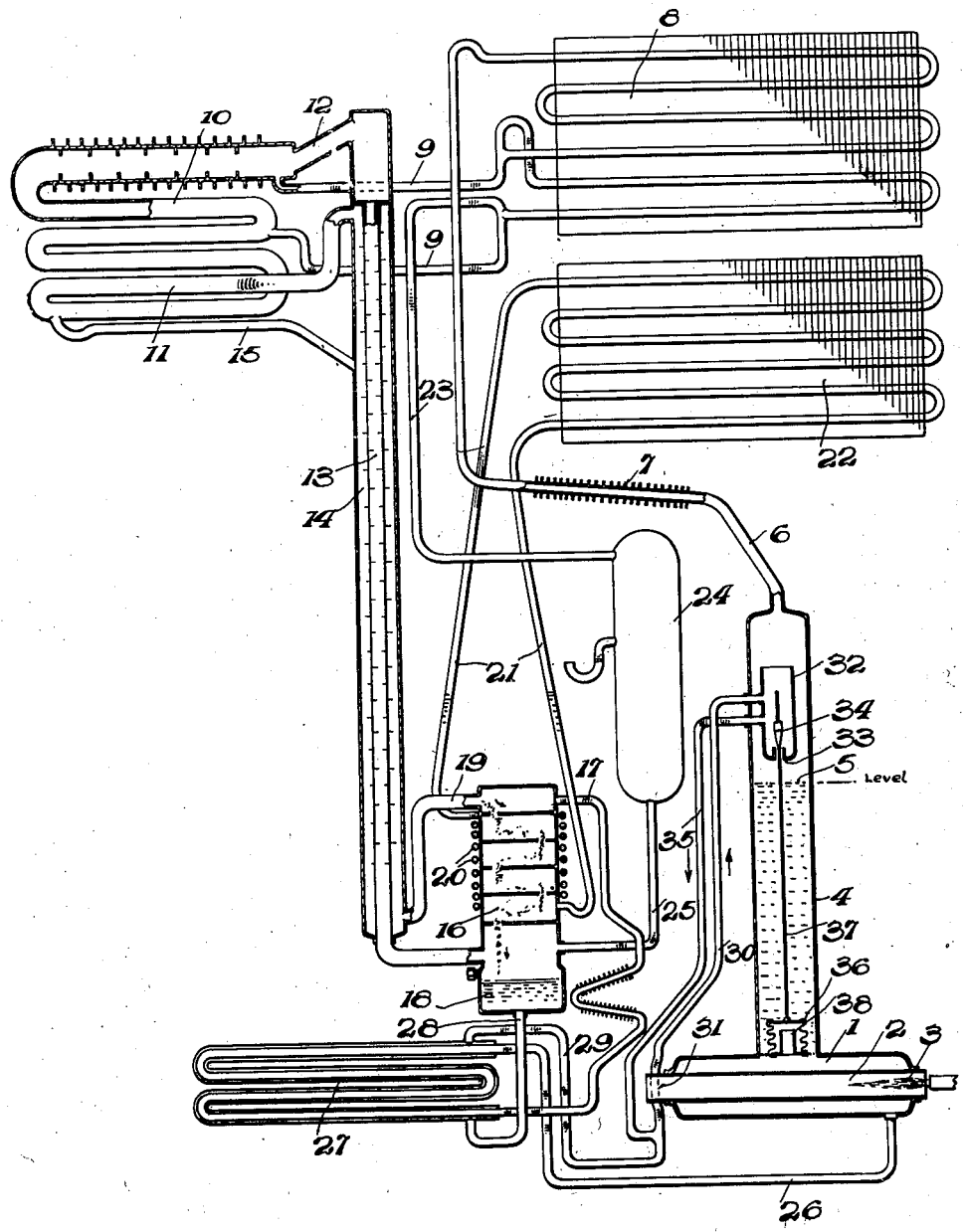

2,290,425

UNITED STATES PATENT OFFICE 2,290,425

CONTINUOUS ABSORPTION REFRIGERATING SYSTEM

Ernest W. Guernsey, Baltimore, Md., assignor to Consolidated Gas, Electric Light and Power Company of Baltimore, Baltimore, Md., a corporation of Maryland Application May 25, 1938, Serial No. 210,064

10 Claims. (Cl. 62—5)

This invention relates to refrigerating systems of the continuous absorption type and more particularly to the control of the circulation of solution in such a system.

A refrigerating system of the continuous absorption type, generally speaking, comprises a sealed system containing a charge which includes a solution such as ammonia in water and a gas such as hydrogen. In the following specification a charge of these materials is assumed for purposes of description but it will be understood that the invention is not limited to the use of these particular materials. The operation of such systems may be considered typically as a combination of three cycles, the cycle of the ammonia solution, the cycle of the ammonia vapor, and the gas or hydrogen cycle. The solution circulates from a generator, wherein it is heated to drive off ammonia vapor, to an absorber where ammonia vapor previously driven off is reabsorbed, and then returns to the generator. The ammonia vapor driven off in the generator is the refrigerating medium. It circulates from the generator to a condenser and thence to an evaporator where it evaporates while absorbing heat and thus produces refrigeration, and it is then returned to the absorber to be reabsorbed in the solution. The gas circulates from the absorber to the evaporator where it removes the ammonia vapor and returns it to the absorber.

In systems of this type as heretofore used, both the rate of circulation of the solution and the distillation of ammonia from the solution are controlled by the heat input rate to the generator, and the design is therefore determined by the necessity for insuring sufficient circulation of solution under conditions of high temperature and high load. One result is that the circulation of solution under normal conditions is more rapid than necessary with consequent losses in efficiency of the system.

It is an object of the present invention to control the circulation of solution in such a system independently of the heat input rate to the generator.

Another object is to control the circulation of solution in such a manner as to maintain the weak solution leaving the generator at a substantially constant predetermined concentration.

Another object is to maintain the lowest practicable concentration of the weak solution leaving the generator in order to enable as complete removal of ammonia from the circulating hydrogen as possible.

A further object is to prevent excessive circulation of the solution under some conditions thereby reducing thermal losses in the liquid heat exchanger.

A still further object is to deliver a more concentrated solution to the generator under some operating conditions thereby reducing the moisture content of the ammonia vapor produced by the generator.

Another object is to provide novel means for controlling the circulation of solution in such a manner that the concentration of the weak solution leaving the generator is maintained at a substantially constant predetermined value whereby the efficiency of the system is increased.

The drawing illustrates diagrammatically a typical refrigerating system of the continuous absorption type, which is provided with one form of circulation controlling means embodying the invention, but it is to be expressly understood that the invention can be embodied in other forms as well as in other systems and that the drawing is for purposes of illustration only and is not to be taken as a definition of the limits of the invention, reference being had to the appended claims for this purpose.

Referring now to the drawing, the generator, which may be of any suitable type, is here shown as a tubular container 1 through which passes a heating tube 2. Any suitable heating means can be employed to heat the generator, such as the gas flame 3 burning in the tube 2, it being understood that the operation of the heating means is preferably controlled automatically in accordance with the requirements of the refrigerating system. A substantially vertical column 5 is in open communication with the upper part of the container 1 and forms a part of the generator, the container and part of the column being filled with solution as indicated by the level 5 in the column. The quantity of solution in the generator is replenished by the return of strong solution from the absorber as hereinafter described.

Ammonia vapor driven off in the generator passes upwardly through the tube 6 through a rectifier 7, wherein any entrained moisture is condensed, to the ammonia vapor condenser 8. The liquid ammonia here produced flows through the pipes 9 into the evaporator 10, and as it flows downwardly through the coils of the evaporator, it absorbs heat, evaporates and produces refrigeration.

The ammonia vapor produced in the evaporator 10 is carried off by a current of hydrogen which enters the bottom of the evaporator by means of the pipe 11. The current of hydrogen passes upwardly through the evaporator coils and continuously removes ammonia vapor, forming at the top of the evaporator a cool, heavy mixture of hydrogen gas and ammonia vapor. This ammonia-rich mixture leaves the evaporator by the pipe 12 and passes downwardly through the central pipe or chamber 13 of a gas heat exchanger wherein it is surrounded by a rising current of warm light hydrogen gas in the external pipe or chamber 14 of the gas heat exchanger. Any unevaporated liquid ammonia drains from the bottom of the evaporator through the pipe 15 and is added to the descending current of gas and vapor in the central chamber 13.

The descending mixture of ammonia vapor and hydrogen gas, which has been warmed somewhat in the gas heat exchanger, passes from the exchanger into the bottom of the absorber 16 wherein it comes in contact with weak solution entering the top of the absorber through the pipe 17. The ammonia vapor is thereby absorbed in the solution, forming a quantity of strong solution in the bottom of the absorber at 18, while the hydrogen, now substantially free of ammonia vapor, passes out at the top of the absorber through the pipe 19 and into the external chamber 14 of the gas heat exchanger as above described.

The heat which is liberated in the absorber 16 by the absorption of the ammonia vapor therein may be carried away by any suitable means such as the cooling coil 20 which is connected by pipes 21 with a condenser 22, this system containing a charge of a suitable vaporizable and condensable substance such as methyl chloride. The system may also include provision for increasing the pressure in the system in the event that said pressure is insufficient to condense all of the ammonia vapor produced by the generator, as by reason of excessive temperature. In this event excess ammonia vapor passes from the condenser 8 by way of the pipe 23 to the pressure chamber 24 wherein it displaces a quantity of hydrogen gas through the pipe 25 into the absorber 16, thus increasing the pressure within the system in known manner.

The weak solution leaves the generator 1 by means of a pipe 26 and passes through the inner tubes of a liquid heat exchanger 27 to the inlet pipe 17 at the top of the absorber. The strong solution shown at 18 in the bottom of the absorber passes out through the pipe 28 to the outer tubes of the liquid heat exchanger 27 and is then returned to the generator to replenish the supply of solution therein.

The present invention provides means for controlling the return circulation of the strong solution so that the amount of strong solution supplied to the generator is regulated to maintain a substantially constant concentration of ammonia in the solution leaving the generator. Any suitable flow regulating means may be employed for controlling the flow of the strong solution, but preferably and in the form shown an automatically adjusted valve is employed. The strong solution leaves the liquid heat exchanger 27 by a pipe 29 which leads to the vertical pipe 30 of a thermal siphon, the pipe 30 passing in heat exchanging relationship with the heating element of the generator as indicated diagrammatically at 31. Preferably the quantity of heat transferred to the solution is insufficient to remove any substantial quantity of ammonia vapor therefrom. The rising current of strong solution in the pipe 30 is discharged into a cup-like container 32 mounted in any suitable manner in the upper part of the vertical column 4 above the liquid level 5 and having in its bottom a drain opening 33 controlled by a suitable valve 34. In order to insure an adequate supply of liquid for all conditions, the thermal siphon is preferably designed to supply a slight excess over the actual flow required and an overflow pipe 35 leads from the container 32 and discharges into the pipe 30 at a point below the section 31 thereof.

The position of the valve 34 is automatically adjusted to control the amount of strong solution delivered to the column 4 according to the concentration of the solution in the lower part of the generator. While from the broad aspect of the invention any suitable means can be employed for this purpose, preferably and as shown herein the valve is controlled by pressure responsive means arranged to be responsive to the difference between the pressure of the solution in the generator and the pressure of a solution at the same temperature and of the desired predetermined concentration to be maintained at the outlet of the generator. In the form shown, a collapsible and expansible vessel 36 is disposed at the bottom of the column 4 and is immersed in the solution therein, said vessel containing a quantity of said solution at the desired predetermined concentration. Expansion and contraction of the vessel 36 adjusts the position of the valve 34 by any suitable actuating connection such as the connecting rod 37.

The general operation of a system of this type is well understood in the art and will be clear from the foregoing description. With respect to the control of the circulation of solution, it will be seen that when the concentration of the boiling solution in the genertaor is stronger than the concentration of the solution in the vessel 36, the external pressure will be greater and the vessel 36 will collapse, moving the valve 34 toward closed position. On the other hand, when the concentration of the boiling solution in the generator is weaker than the concentration of the solution in the vessel 36, the internal pressure will be greater and the vessel 36 will expand, moving the valve 34 away from the closed position. When the unit is not operating, there is very little pressure within the vessel 36 but there is a large pressure in the unit due largely to hydrogen which tends to collapse said vessel and hence to close the valve 34. Preferably the valve comprises a cylindrical plug which is tapered at its lower end and is drawn into a closely fitting cylindrical opening, as this construction avoids the high stresses which would result, especially during non-operating periods, if the valve closed against a definite seat. A stop 38 may also be provided within the bellows to limit its movement to that required for the closing of the valve.

Preferably valve 34 is so placed that it is just opening when the internal and external pressures on the bellows are balanced, so that whenever the concentration of solution in the generator becomes greater than desired, the valve is immediately closed and the supply of strong solution to the column 4 is thereby shut off until the concentration in the generator falls to or below the desired value. In some cases, however, it may be desirable to place the valve so as to be entirely open when the internal and external pressures on the bellows are equal and to make the concentration of the solution in the bellows slightly less than is desired in the generator. With this arrangement the valve would remain permanently open in case of failure of the bellows so that the unit would continue to operate in the same manner as if no circulation control had been provided.

The advantages of controlling the circulation of solution in the manner described above will be apparent to those skilled in the art. As pointed out above, the design of such systems at present involves excessive circulation under some operating conditions and this excessive circulation results in thermal losses in the liquid heat exchanger 27. The present invention, by preventing such excessive circulation, reduces these losses and increases the efficiency of the system. Moreover, the invention makes it possible to deliver to the generator under some operating conditions a more concentrated solution, which in turn causes a reduction in the moisture content of the ammonia vapor that is produced by the generator. Moreover, control of the circulation of solution assists in obtaining a low concentration of ammonia in the weak solution which is maintained at a predetermined value. This value should be as low as practicable in order to enable the more complete removal of ammonia from the circulating hydrogen and thus to make possible a lower temperature in the evaporator. These several factors contribute substantially to increased and uniform efficiency of refrigerating systems of this type.

While only one embodiment of the invention has been described and illustrated in the drawing, it is to be understood that the invention is not limited to this embodiment but is capable of a variety of mechanical expressions, many of which will now occur to those skilled in the art, and that changes may be made in the form, details of construction and arrangement of the parts, all without departing from the spirit of the invention. Reference should therefore be had to the appended claims to determine the limits of the invention.

What is claimed is:

1. A refrigerating system of the continuous absorption type comprising means for heating a solution of a refrigerating medium in a liquid to drive off said medium in vapor form, means for circulating said medium through a refrigerating system and reabsorbing the same in said solution and then returning said solution to said heating means, and pressure responsive means for controlling the amount of solution returned and subjected to the pressure of the solution in said heating means for maintaining a substantially constant predetermined concentration of said solution discharged therefrom.

2. A refrigerating system of the continuous absorption type comprising means for heating a solution of a refrigerating medium in a liquid to drive off said medium in vapor form, means for circulating said medium through a refrigerating system and reabsorbing the same in said solution and then returning said solution to said heating means, and pressure responsive means for controlling the amount of said solution returned to maintain a substantially constant predetermined concentration of said medium in the solution at the outlet of said heating means, said pressure responsive means being responsive to the difference between the pressure of the solution in said means and the pressure at the same temperature of a solution of said predetermined concentration in substantial thermal equilibrium with the solution in said heating means.

3. A refrigerating system of the continuous absorption type comprising means for heating a solution of a refrigerating medium in a liquid to generate refrigerating vapor, means for circulating said vapor through a refrigerating system and reabsorbing the same in said solution and then returning said solution to said heating means, and means for controlling the amount of solution returned to maintain a substantially constant predetermined concentration of said medium in the solution at the outlet of such heating means and comprising a collapsible and expansible vessel subjected to the pressure and temperature of the solution to be controlled and containing a quantity of said solution at said predetermined concentration.

4. A refrigerating system of the continuous absorption type comprising a generator for heating a solution of a refrigerating medium in a liquid, said generator comprising an evaporating column containing said solution and from which refrigerating vapor is generated, means for circulating said vapor through a refrigerating system and reabsorbing the same in said solution and then returning said solution to said column, and means for maintaining in said column a substantially constant predetermined concentration of said medium in the solution discharged from the column, comprising a collapsible and expansible vessel immersed in said solution and containing a quantity of said solution at said predetermined concentration and means controlled by said vessel for regulating the amount of solution returned to said column.

5. A refrigerating system of the continuous absorption type comprising a generator for heating a solution of a refrigerating medium in a liquid, said generator comprising an evaporating column containing said solution and from which refrigerating vapor is generated, means for circulating said vapor through a refrigerating system and reabsorbing the same in said solution, means for returning said solution to the top of said column to replenish the supply therein, and pressure responsive means for controlling the return of said solution, said pressure responsive means being responsive to the difference in pressure between said solution and the pressure at the same temperature of a solution of a predetermined concentration in substantial thermal equilibrium with the solution in said generator.

6. A refrigerating system of the continuous absorption type comprising a generator for heating a solution of a refrigerating medium in a liquid, said generator comprising an evaporating column containing said solution and from which refrigerating vapor is generated, means for circulating said vapor through a refrigerating system and reabsorbing the same in said solution, means for returning said solution to the top of said column to replenish the supply therein, and means for controlling the return of said solution including a collapsible and expansible vessel subjected to the temperature and pressure of said solution near the point of discharge from said column and containing a quantity of said solution at a predetermined concentration, whereby the concentration of the solution discharged from said generator is maintained substantially constant at said predetermined value.

7. A refrigerating system of the continuous absorption type comprising a generator and an absorber, said generator having means for heating a solution of a refrigerating medium in a liquid to generate refrigerating vapor, means for circulating said vapor through a refrigerating system to said absorber, means for circulating solution from the generator to the absorber to absorb said vapor, means for returning said solution to said generator, valve means for controlling the amount of solution returned to said generator and pressure responsive valve operating means responsive to the difference between the pressure of the solution in said generator and the pressure at the same temperature of a solution of a predetermined concentration in substantial thermal equilibrium with the solution in said generator.

8. A refrigerating system of the continuous absorption type comprising a generator having an evaporating column and containing a solution of a refrigerating medium in a liquid, means for heating the generator to generate refrigerating vapor, a container disposed above the level of the solution in said column and having a drain opening in its bottom, means for reabsorbing said vapor in said solution and returning said solution to said container, a valve for said drain opening, and means for automatically adjusting said valve in accordance with the concentration of the solution in said generator.

9. A refrigerating system of the continuous absorption type comprising a generator having an evaporating column and containing a solution of a refrigerating medium in a liquid, means for heating the generator to generate refrigerating vapor, a container disposed above the level of the solution in said column and having a drain opening in its bottom, means for reabsorbing said vapor in said solution and returning said solution to said container, a valve for said drain opening, and valve actuating means responsive to the difference in pressure between the solution in said generator and a solution at the same temperature and of a predetermined concentration.

10. A refrigerating system of the continuous absorption type comprising a generator having an evaporating column and containing a solution of a refrigerating medium in a liquid, means for heating the generator to generate refrigerating vapor, a container disposed above the level of the solution in said column and having a drain opening in its bottom, means for reabsorbing said vapor in said solution and returning said solution to said container, a valve for said drain opening, and valve actuating means comprising a collapsible and expansible vessel subjected to the temperature and pressure of the solution in said generator and containing a quantity of said solution at a predetermined concentration.

ERNEST W. GUERNSEY.